Nov. 26, 1940.　　　　　S. E. WISE　　　　　2,223,145
WINDSHIELD COVER
Filed Feb. 16, 1940
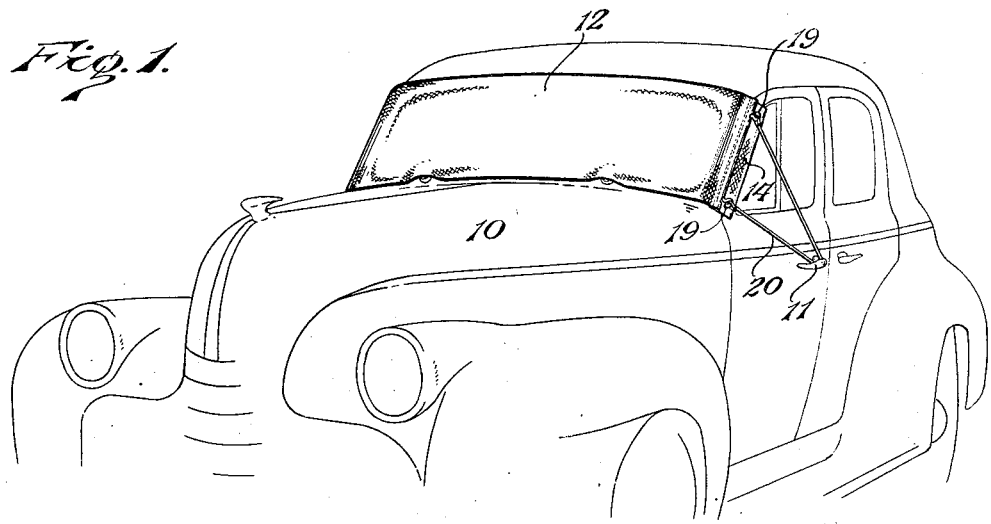
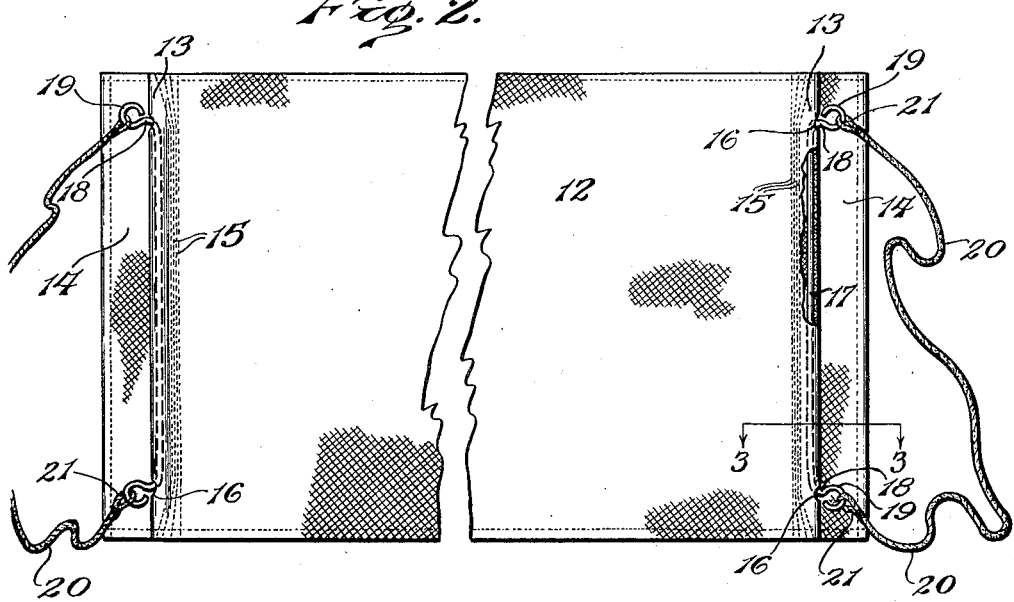
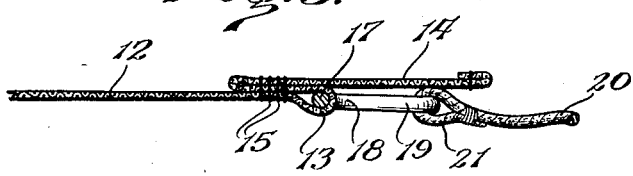
Sailor E. Wise
INVENTOR
BY Thos. H. Johnston
ATTORNEY
E. P. Carman
WITNESS Patented Nov. 26, 1940

2,223,145

UNITED STATES PATENT OFFICE 2,223,145

WINDSHIELD COVER

Sailor E. Wise, Pittsburgh, Pa., assignor of one-half to Kenneth B. Hamlett, Washington, D. C.

Application February 16, 1940, Serial No. 319,330

3 Claims. (Cl. 296—84)

This invention relates to an improved windshield cover.

As is well known, the windshields of automobiles parked out-of-doors very often, in winter, collect ice and snow, with the result that vision through the windshield is seriously hampered if not rendered impossible. Accordingly, it is necessary to first clean the windshield before the car may be safely driven. This operation is not only tedious but also, often disagreeable, due to weather conditions.

It is therefore an object of the present invention to provide a cover which may be disposed over the windshield of an automobile for protecting said windshield and preventing the collection of ice and snow thereon.

A further object of the invention is to provide a cover which will not scratch or mar the windshield or the finish of the automobile body and which may be easily and quickly applied and as easily removed.

Still another object of the invention is to provide a cover which, upon being removed, may be readily rolled up and conveniently carried in the automobile.

And the invention seeks, as a still further object, to provide a cover which may be readily manufactured and sold at nominal price.

Other and incidental objects of the invention will appear during the course of the following description, and in the drawing:

Figure 1 is a perspective view showing my improved cover applied over the windshield of a conventional automobile.

Figure 2 is a front elevation of the cover, parts being broken away.

Figure 3 is a fragmentary horizontal section on the line 3—3 of Figure 2, looking in the direction indicated by the arrows.

For convenience, I have shown my improved windshield cover in conjunction with a conventional automobile 10, the handles of the front doors of which are indicated at 11. The windshield of the vehicle is concealed by the cover but, as will be understood, said windshield consists of the usual panel of glass mounted in a suitable frame.

In carrying the invention into effect, I employ an oblong apron 12, preferably of uniform width somewhat greater than the height of the windshield of the vehicle 10, as shown in Figure 1 of the drawing, and of a length somewhat greater than the length of the windshield so that the ends of the apron will fold rearwardly at the sides of the vehicle. Endwise slipping of the apron is thus prevented while, also, the windshield is completely covered by the apron.

The apron 12 is preferably formed of appropriate fabric such as canvas or the like and, if so desired, the fabric may be suitably treated to render it water-proof. However, I do not wish to be limited in choice as oilcloth, ticking or other suitable material may be used.

As shown in Figure 3 of the drawing, the apron 12 is looped near its ends rearwardly upon itself to form hems 13 extending from edge to edge of the apron and at the inner limits of said hems, the apron is again folded outwardly upon itself to provide terminal flaps 14 at the ends of the apron. Triple-ply thicknesses are thus provided at the inner margins of the hems and extending through said thicknesses are lines of stitching 15 securing the hems and flaps. As will be observed, the flaps extend well beyond the hems 13 therebeneath.

Formed in the hems 13 near the ends thereof are suitable openings 16 and mounted in said hems are stretcher rods 17 of suitable resilient wire or other appropriate material. These rods are bent near their ends to provide lateral shanks 18 which extend through the openings 16 and formed on said shanks are terminal eyes 19 overlying the flaps 14.

Connected at their ends to the eyes 19 of the rods 17 are tie loops 20 of suitable elastic cord or the like and while it is contemplated that, if desired, a separate tie string of appropriate length may be attached to each eye still, the loops are preferred. If non-elastic cords are employed to form the loops, a suitable spring or an appropriate length of elastic may, if so desired, be operatively associated with each loop to impart the desired elasticity thereto. As will be observed, the ends of the loops 20 are formed with sockets 21 which are slipped into engagement with the eyes 19 so that while the loops may not accidently become detached still, new loops may be readily installed when necessary.

As will now be seen, the loops 20 are engaged over the handles 11 of the automobile and serve to hold the apron 12 in position overlying the windshield stretched more or less tautly thereover. The windshield will thus be protected by the apron against rain or snow or the formation of ice thereon. As will be appreciated, the apron may be readily installed or removed and attention is directed to the fact that since the flaps 14 underlie the eyes 19 of the rods 17, said flaps will protect the finish of the car body from being marred or scratched by said eyes. When not in use, the apron with its attached loops may, of course, be readily rolled up and conveniently carried in the automobile.

Having thus described my invention, I claim:

1. A windshield cover including an apron of a length and width to overlie the windshield of an automobile having exterior door handles, said apron being provided near its ends with hems having terminal flaps extending therefrom, stretcher rods disposed in said hems and provided at their ends with eyes disposed externally of said hems short of the ends thereof to overlie said flaps, and elastic loops connected at their ends to said eyes and engaged over said handles for securing the apron in position stretched by said loops over the windshield and having said flaps disposed beneath the eyes to prevent abrasion of the automobile thereby.

2. A windshield cover including an apron of a length and width to overlie the windshield of an automobile, said apron being provided near its ends with hems and having terminal flaps extending therefrom, stretcher rods disposed in said hems and provided with portions extending therefrom over said flaps, and means connected to said portions of the rods for securing the apron in position having said flaps underlying said portions of the rods to prevent abrasion of the automobile thereby.

3. A windshield cover including an apron of a length and width to overlie the windshield of an automobile having exterior projections, said apron being looped near its ends rearwardly upon itself to form hems and having its end portions extended outwardly beneath the hems to provide terminal flaps at the ends of the apron, said hems being formed near the ends thereof with openings, stretcher rods disposed in said hems and provided near the ends thereof with lateral shanks extending through said openings and formed with terminal eyes overlying said flaps, and cords connected to said eyes and engaged with said projections of the automobile for securing the apron in position having said flaps underlying the eyes to prevent abrasion of the automobile by said eyes.

SAILOR E. WISE.